UNITED STATES PATENT OFFICE.

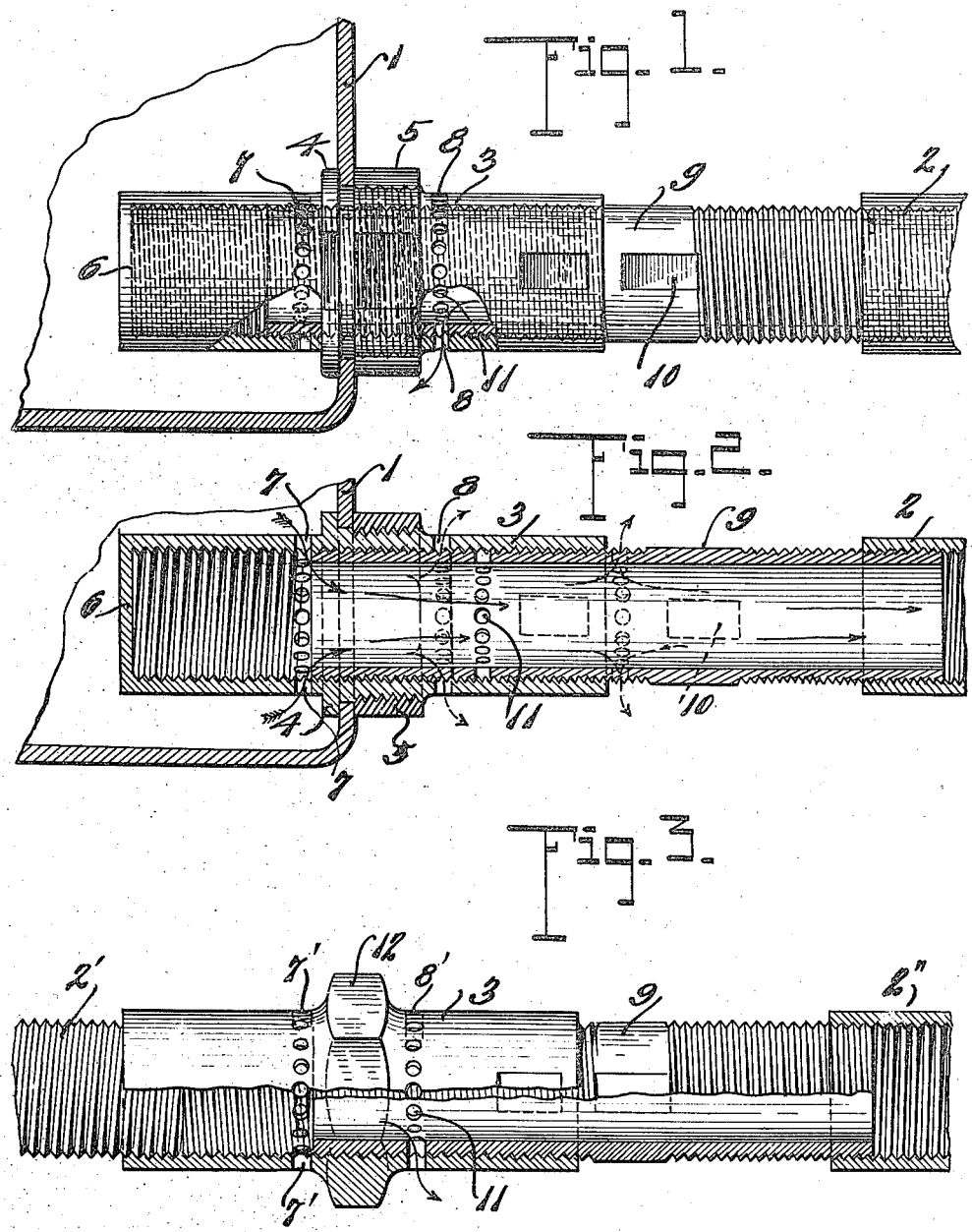

BLANCHARD B. EMERSON, OF LESLIE, ARKANSAS.

ANTIFREEZE PIPE-JOINT.

1,260,762. Specification of Letters Patent. Patented Mar. 26, 1918.

Application filed December 8, 1916. Serial No. 135,814.

*To all whom it may concern:*

Be it known that I, BLANCHARD B. EMERSON, a citizen of the United States, residing at Leslie, in the county of Searcy and State of Arkansas, have invented a new and useful Antifreeze Pipe-Joint, of which the following is a specification.

The present invention has to do with improvements in means for draining liquids from reservoirs, pipe lines or water systems in general for cleansing purposes or with a view to preventing the liquid from freezing, as the case may be. It is the primary object of my device to provide a simple arrangement, which may take different forms but is capable of insertion at the desired point in conducting pipes and which by movement of one of its elements permits either the drainage of the supply or drainage of the pipe line without drainage of the supply, according to the direction and extent of movement of such part, thereby eliminating any necessity of entire disconnection of the pipes to accomplish the desired result.

With the above and other objects in view, this invention consists in the novel construction, combination and arrangement of parts, as hereinafter more particularly pointed out and illustrated in the accompanying drawing, wherein:

Figure 1 is a side elevation of the device which forms the subject matter of this invention, the same constituting a drainage means and cut-off, parts being broken away and shown in section;

Fig. 2 is a longitudinal sectional view; and

Fig. 3 is a slight modification of the invention as constructed to constitute a pipe joint.

Referring to the drawings, 1 indicates a reservoir for holding water or other liquid to be supplied to the pipe line 2 intermediate which and the reservoir my device is introduced. The same consists of a relatively stationary member 3 having intermediate its length an annular flange 4 coacting with the interior wall of the tank, said member being threaded to receive a clamping nut 5 coacting with the outer wall of the tank and by means of which the stationary member is held in position. The member 3 is interiorly threaded and preferably closed by an integral end 6 or by plugging said end in any well known manner as may be desired. Adjacent to the flange 4 is a series of openings 7 constituting an inlet by which the liquid from the reservoir passes through the stationary member under the control of the movable element of my device hereinafter described.

Exteriorly of the tank is a second series of openings 8 in this member 3, which openings constitute the drain outlet or discharge as will be apparent from the following description. The device embodies the movable element or nipple 9 which is provided with right and left hand threads at the respective ends so as to be screwed into the stationary member 3 at one end and into the pipe line 2 at the other end, wrench holds 10 being provided intermediate its length for convenience in rotating the nipple to perform its functions.

Normally the inner end of the nipple 9 is so disposed as to uncover the openings 7 of the stationary member as shown in Fig. 3, the said end lying between the inlet openings 7 and the outlet openings 8 of the member 3. This inner nipple is provided with a corresponding series of openings 11 and when the said nipple 9 is screwed into the member 3 so as to occupy the position shown in Fig. 1 the inlet openings 7 are closed while the openings 11 of the member 9 are brought into registry with the discharge openings 8 of the member 3 whereupon the pipe line is drained through the said discharge openings while the supply of water is cut-off from the tank 1. Assuming however that it is desired to drain both the tank and the pipe line, the nipple 9 is screwed toward the right until the openings 11 occupy the dotted line position of Fig. 2 just beyond the outer end of the stationary member 3. The inner end of the nipple then uncovers the discharge openings 8 so that the water from the tank passes through the inlet openings 7 and out the discharge openings 11 and 8.

In Fig. 3 a slight modification of this device is shown in which it is designed essentially as a pipe joint or coupling. The stationary member 3' in this construction is provided with the openings 7' and 8' which are discharge openings for draining the water system as controlled by the position of the nipple 9 which is constructed exactly as disclosed in Figs. 1 and 2. The member 3 in this form is simply enlarged at its central portion to provide wrench holds 12 for facilitating the connection of this member with the pipe line 2', the nipple 9 being connected with the pipe line 2". It will be apparent that the water system in which this joint is embodied may readily be drained without disconnecting the pipes and simply by the manipulation of the nipple 9 in the manner hereinbefore described.

Having thus described my invention, what I claim as new is:

1. In a pipe line system, the combination with a conducting pipe, of a drainage joint connected thereto and comprising a relatively stationary member, and a movable nipple constituting the connection between the pipe and the stationary member, the latter having a waste outlet normally closed by the nipple, said nipple also having a waste outlet normally closed by the stationary member and the nipple being movable to effect discharge to waste through the stationary member outlet or through the nipple outlet according to whether the source of supply for the pipe is to be drained or the pipe only.

2. An anti-freezing pipe joint for water systems consisting of a relatively stationary coupling member having a series of discharge openings, and a connecting nipple threaded at either end for screwing into or out of the stationary member, said nipple having a corresponding series of discharge openings adapted for registry with the first mentioned openings to effect discharge of the system from one direction upon screwing of the nipple into the stationary member, and upon unscrewing therefrom to discontinue discharge, said nipple being further movable to dispose its openings exterior to the coupling member to effect a drainage of the system from opposite directions.

3. In combination, a water supply for a pipe line system, a cut-off and drainage device establishing communication between the supply and the pipe line, and comprising a relatively stationary member having an inlet for the water from said supply and a discharge outlet, and a nipple movably connected to said stationary member and also having a discharge outlet, said nipple being movable in one direction to effect closure of the inlet aforesaid whereby to cut off the water supply from the pipe line, said nipple discharge outlet being disposed to remain closed when the nipple is in such cut-off position, said nipple being further movable toward the stationary member inlet to uncover one of said outlets to effect drainage.

4. In combination, a water supply for a pipe line system, a cut-off and drainage device establishing communication between the supply and the pipe line, and comprising a relatively stationary member having an inlet for the water from said supply and a discharge outlet, and a nipple movably connected to said stationary member and also having a discharge outlet, said nipple being movable in one direction to effect closure of the inlet aforesaid whereby to cut off the water supply from the pipe line, and further movable in the same direction to cause registry of the discharge outlets aforesaid whereby to effect drainage of the pipe line only.

5. In combination, a water supply for a pipe line system, a cut-off and drainage device establishing communication between the supply and the pipe line comprising a stationary member having spaced openings for inlet and discharge purposes, and a connecting nipple having threaded connection with the stationary member and discharge openings therein, said nipple being movable inwardly to cover the inlet of the stationary member whereby to cut off supply from the pipe line and movable outwardly to uncover said inlet and discharge openings in the stationary member and the discharge openings in the nipple whereby to effect simultaneous drainage of the supply and pipe line.

BLANCHARD B. EMERSON.

Witnesses:
J. C. SISSEL,
M. J. FLANNERY.